March 30, 1926. 1,578,694
L. E. WEMPLE
METHOD OF SEPARATING METAL FROM METALLIFEROUS MATERIAL
Filed Nov. 16, 1923
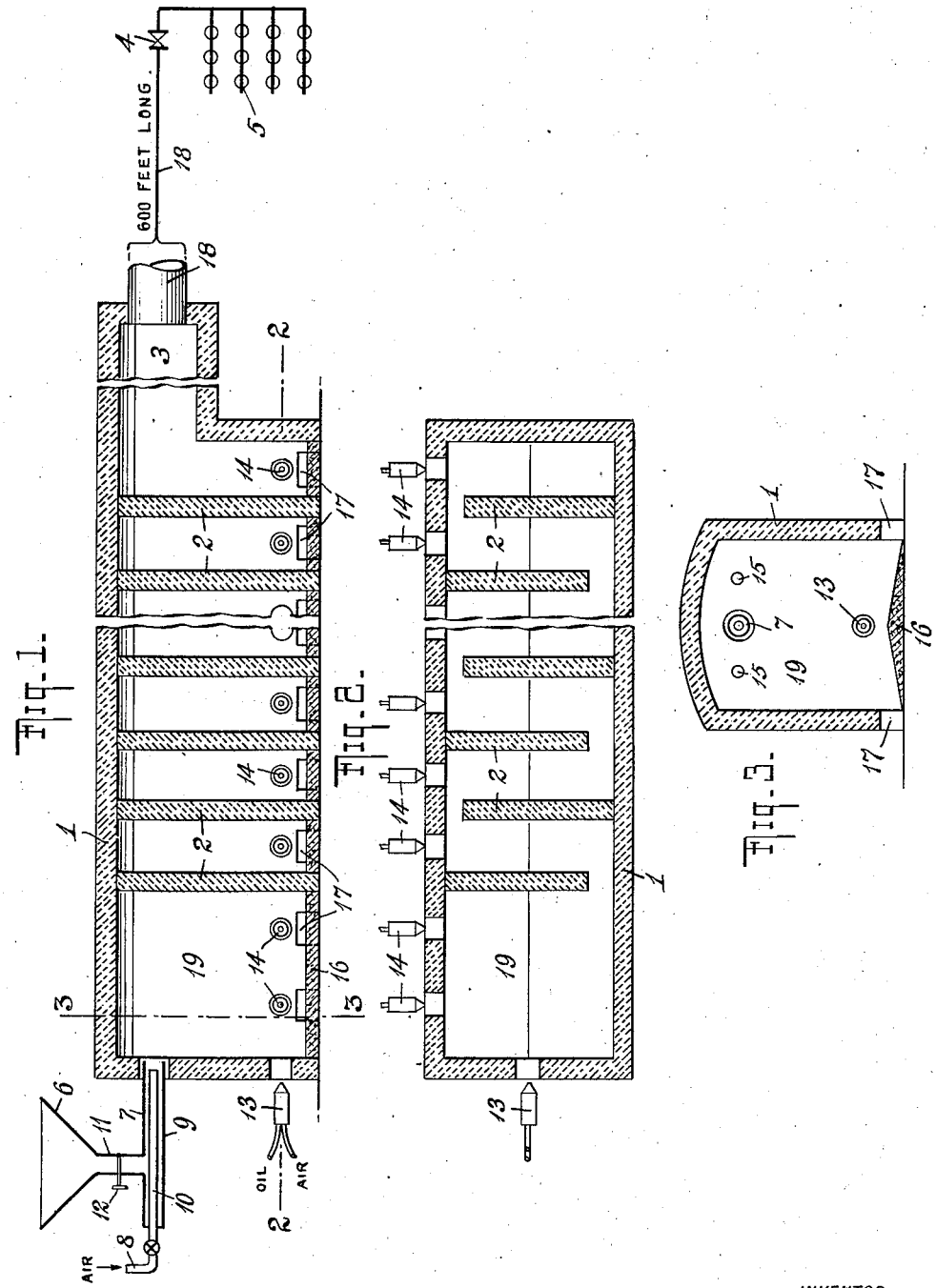
WITNESS
G. V. Rasmussen
INVENTOR
LELAND E. WEMPLE
BY
Briesen Schrenk
ATTORNEYS Patented Mar. 30, 1926.

1,578,694

UNITED STATES PATENT OFFICE.

LELAND E. WEMPLE, OF CLEVELAND, OHIO.

METHOD OF SEPARATING METAL FROM METALLIFEROUS MATERIAL.

Application filed November 16, 1923. Serial No. 675,028.

*To all whom it may concern:*

Be it known that I, LELAND E. WEMPLE, a citizen of the United States, and resident of the city of Cleveland, county of Cuyahoga, State of Ohio, have invented certain new and useful Improvements in Methods of Separating Metal from Metalliferous Material, of which the following is a specification.

My invention relates generally to the art of smelting metalliferous material and particularly ores of such metals as zinc, antimony, cadmium and the like, which in their oxid form constitute a directly usable commercial material. The object of this invention is to produce such metal oxids in a single operation and to accomplish this along lines which are simple, convenient, efficient and economical.

The invention, speaking generally, resides in causing the separation of the metal from the other constituents of the metalliferous material to take place while such material is in a state of extremely fine division and while its particles are in motion suspended in a gaseous environment. If dealt with in this way the metals become volatilized, in the form of a fume, either as metals or as combinations of the metals, for example, oxides and sulfates, while the non-metallic parts of the material remain solid or molten and fall from the stream of gas, whereas the volatilized metal or metal combination upon cooling and in association with accompanying air is recovered in a form which renders it directly available as a completely manufactured commercial article.

Heretofore the processes for treating ores for the recovery of volatile metals in the form of pigments or in the form of a concentrated fume product, as from low-grade ores and metalliferous materials have been generally predicated upon the conception that the metal-bearing material should be of a relatively coarse size, say one-eighth of an inch to one inch or more in diameter. These processes provide for the blowing of a blast of air through a bed or column composed or ore, reduction fuel and flux called the charge, and this charge is supported on a suitably perforated grate in a relatively thin bed, or, when supported on itself in a thicker column, the charge consists of large pieces having a relatively slow melting rate in order that the column may remain porous to the air blast until the volatile materials are reduced and driven off. It is thus necessary to the successful operation of such processes that the charge shall consist of relatively coarse lumps which, when superimposed, yield interstitial spaces through which the forced air blast shall pass freely. Attempts to treat fine ores or to use fine sized reduction fuels and flux by any such processes have proved unsuccessful as the charge is too compact and the passage of air so impeded that the smelting temperatures are not obtained throughout the charge. In some instances resort has been had to an artificial coarsening of the ore, fuel and flux before they are introduced into a charge or to an enlargement of the particles of the charge itself by means of a preliminary treatment consisting of briquetting or nodulizing the materials into the desired size. Such preliminary treatments add greatly to the cost of the entire smelting operation and in some cases the briquetted lumps melt or disintegrate in the smelting furnace before the metal content of the charge is completely driven off. This inefficiency and the added expense render the smelting of some ores or metalliferous materials by the known processes uncommercial.

According to the process of this application the reduced size of the ore particles is no longer a disadvantage, but, on the contrary, the finer these materials are obtainable, the more satisfactory will be the operation of my process. According to the new process satisfactory results will be obtained if all of the materials composing a charge are reduced to a size which will permit them to pass through a screen having approximately 200 mesh per square inch. These materials in this condition of fine division are mixed in suitable proportions and atomized or "blasted" into a properly heated combustion chamber. The chemical reaction takes place almost instantaneously and the effect is that of smelting gaseous mixtures rather than solids. Conditions must, however, be such as to allow a thorough separation to take place between the desired volatile substances and the concomitant undesired solids or melted parts. By providing suitable contact surfaces and changes in temperature and by properly directing the flow of the products of the smelting reactions, those products which are non-volatile will be thrown down and separated out of the stream while the products of volatilization are carried off by means of the forced draft to more distant points where they are cooled and passed through collecting devices which (for example by filtration) separate and collect the volatilized metalliferous materials in the form of a fume and allow those products of the smelting which remain gaseous at relatively low temperatures to pass through and escape.

The invention may be carried out in the apparatus illustrated in the accompanying drawing in which Fig. 1 is a diagrammatic sectional elevation of the furnace, Fig. 2 a horizontal section of the furnace shown in Fig. 1 and Fig. 3 a cross section of said furnace. In the drawing 1 indicates the furnace and 2 baffles therein to form a sinuous passage for the gases, fumes, etc., 3 is the exit conduit, 4 the suction fan, 5 the collecting device, for instance filtering bags for the product. At one end of the furnace 1 there is a hopper 6 containing the charge. This charge, as stated, consists of material usually comprising in addition to the ore or other metalliferous substance to be treated, reduction fuel and fluxing material. These constituents of the charge, if not received from the mines or other source of supply in a size sufficiently small to pass through a 200 mesh are first dried and ground to that size and then mixed in the proper proportion. The proportion will obviously be different to meet varying conditions, but generally the proportions are those which are employed where the smelting of coarser particles (of the same chemical composition) as heretofore described has been conducted. In the case of zinc ores the mixture may vary from equal parts to two or more parts of fuel to one part of ore, depending upon the grade of the ore and fuel and in certain cases there is also added to this mixture a quantity of flux, for example, 20% to 10% limestone also ground to the proper size. This mixture thus prepared is stored in suitable bins adjacent to or overhead the furnace or retort in order that it may be fed by gravity. For the purpose of illustration, the charge has been shown as stored in the hopper 6 from which it enters the burner or atomizer 7. This burner may be of any suitable design capable of delivering a charge of this character into the furnace in a finely dispersed or atomized condition by means of air, steam, gas or other agent introduced at 8. A satisfactory burner consists of a piece of steel pipe 9 about three feet long and four inches in diameter, the outer end closed with a bushing through which passes a two inch steel pipe 10, terminating about six inches from the mouth of the four inch pipe. The two inch pipe is connected with a supply of compressed air, the pressure of which is regulated by suitable valves. About ten inches from the outer end of the four inch pipe 9 there is an upper in-take opening of about three inches diameter with which the pipe 11 communicates and through which the charge enters. A slide gate 12 in this in-take pipe 11 regulates the quantity of charge entering the burner. The burner 7 is set in the front wall of the furnace at about three-fourths of the height of the furnace and the inner end of the burner is approximately flush with the inner side of the wall of the furnace. Compressed air is generally turned on first at a pressure which it will give it a high velocity and induce a strong suction. The gate 12 of the charge in-take is then opened and the charge drawn into pipe 9 and discharged into the furnace at high velocity and in finely dispersed condition. Within the furnace there prevails a condition of heat adequate to the process supplied through an oil-air burner 13 and supplemental burners 14. When the charge is atomized into the furnace, it becomes ignited and heated to the necessary smelting temperature. It has been found that a small volume of air at a pressure of about sixty pounds per square inch may be used in operating the injector 8 and will be sufficient to inject and to atomize large quantities of the charge. Additional air at lower pressures for the purpose of supporting combustion may be introduced through other parts, such as 15.

The floor of the furnace is preferably shaped as indicated at 16 to enable the solid parts of the ore or other metalliferous material to accumulate for ready removal through the door 17. The furnace may be of variable dimensions, depending on the quantity of charge smelted per minute and the smelting temperature required. For the treatment of zinc ore charge of the described characteristics at the rate of one hundred and fifty pounds per minute requiring a smelting temperature of about 2500° F. I prefer to use a furnace constructed of fire brick, suitably braced, having inside dimensions of about four feet width, six feet height and forty feet length. At the exit end of the furnace is a steel cooling pipe 18 about twenty-four inches diameter and about six hundred feet in length. For the first ten feet the furnace adjacent to the burner 7 is unobstructed and forms the laboratory 19 in which the primary smelting reactions take place. The auxiliary burners 14 which may be adapted for consuming gas, oil or powdered coal or other fuel are installed at the sides of the laboratory 19 for the purpose of heating this chamber to the proper temperature to ignite the charge and to maintain smelting reactions. After the laboratory 19 has been heated to the proper degree, these auxiliary burners may be shut off in part or entirely and the burner 13 may be similarly operated and controlled. The laboratory 19 is terminated by one of the baffle walls 2 which extends from bottom to top and from one side to within about ten inches of the opposite side of the furnace. The remaining thirty feet of the furnace has similar baffle walls placed about every six feet apart but in alternate and opposite directions, thus producing not only a series of baffle for the products of smelting to strike against, but also giving repeated changes in the direction of flow. By these means liquid and solid non-volatile products are caused to settle out and to fall to the bottom of the furnace where they are removed from time to time through suitable doors 17. The temperature of the entire furnace is maintained at a degree which prevents the volatile metal compounds from depositing with the non-volatile matter. The suction fan 4 provides a draft through the furnace which carries the fume and gases through the cooling pipe 18. To collect any small quantities of non-volatile products which may be entrained into the cooling pipe 18, I prefer to instal cyclone settlers at its cooler end. By a proper adjustment of the draft practically all of the fume is drawn out of the furnace through the cooling pipe 18 and filtered through a series of cloth bags 5 into which the suction fan 4 discharges through suitable pipes. The operation of the bag filters is similar to that of established practice.

It will be observed that the smelting of the ore or other metalliferous material in the laboratory 19 takes place while the minute particles of ore are in motion and supported in a gaseous environment. The metal as it volatilizes from the ore, either as metal or as volatile compounds of the metal with other substances, remains in the form of a fume, whereas all liquefied and solid parts of the ore, fuel and flux, if present, will fall to the floor of the furnace or strike against the walls 2, (largely against the first one), the tendency in either case being to eject such matter from the gas stream carrying the fumes of metal compounds. This ejecting effect is repeated as the gases find their way through the passages formed by the partitions 2. The entire smelting operation is thus performed on an ore or other metalliferous substance which at the time of smelting is a floating particle of diminutive size. The volatile metals or compounds which are reduced by the treatment in the furnace usually combine with oxygen to form chiefly metal oxides. The recovery or product is thus zinc oxid (in those cases where zinc ore is used as the starting material) and is in a form and condition where it is directly available for sale and use.

I do not claim to be the first to have performed a chemical reaction on material exposed in a state of fine division to heat and to co-acting chemical matter while the chemical under treatment is suspended in a gaseous atmosphere, but I do claim that I am the first to conduct a smelting operation with extremely fine particles of ore or other metalliferous material and to effect the separation of the metallic values from such ores or other metalliferous material during flotation or suspension in a gaseous environment.

I claim:

A process which comprises blasting into a heated furnace chamber, a mixture of metalliferous material containing a volatilizable metal, solid carbonaceous fuel and flux, the ingredients being in proportions sufficient to wholly reduce the metalliferous material, also maintaining heating means in said chamber, separate from the blast of said mixture of fuel, flux and metalliferous material and thereby maintaining in said chamber a temperature high enough to vaporize substantially all of said vaporizable metal, causing the vaporized and fumed material to travel through a tortuous passage, while hot and while maintaining oxidizing conditions therein during a part at least of said travel, and thereafter collecting the oxidized vaporizable metal, substantially free from slag.

In testimony whereof I have hereunto set my hand.

LELAND E. WEMPLE.